UNITED STATES PATENT OFFICE.

CLYDE E. SCHULZ, OF FORT DODGE, IOWA.

PROCESS FOR REPAIRING MOTOR-VEHICLE RADIATORS.

1,319,670.  Specification of Letters Patent.  Patented Oct. 21, 1919.

No Drawing.  Application filed March 29, 1917. Serial No. 158,443.

*To all whom it may concern:*

Be it known that I, CLYDE E. SCHULZ, a citizen of the United States, and resident of Fort Dodge, in the county of Webster and State of Iowa, have invented a certain new and useful Process for Repairing Motor-Vehicle Radiators, of which the following is a specification.

The object of my invention is to provide a comparatively simple and inexpensive process for thoroughly repairing radiators of the type used for cooling the water used in connection with the water jacket on the internal combustion engine of a motor vehicle.

A further object is to provide such a process, whereby the breaks or broken seams in the radiator tubes are first worked on for bringing the separated edges snugly together, and thereafter the tubes are thoroughly cleaned on their exteriors with acid or the like, and thereafter molten solder is poured through the radiator for forming a thin film or coating of solder around the tubes for closing any breaks therein.

With these and other objects in view my invention consists in the process hereinafter more fully explained, and defined, and set forth in my claims.

It is well known that the tubes of the radiators of motor vehicles are ordinarily formed with longitudinal seams where the adjacent edges of the tube are folded over each other for forming a joint. Owing to the various vicissitudes of long use, and to the vibration of the car and other rough uses to which it may be subjected; and owing also especially to the freezing of the water in the radiator, it frequently happens that these seams become spread, or that in some way the walls of the tubes become broken, with the result that the tubes of the radiator leak water. In order to properly operate the engine it is necessary that the causes for such leaks be removed as soon as possible.

Various processes for repairing radiators have been employed. Probably the most common way is to take a comparatively thin stick of wire solder and lay it against the tube to be repaired as near to the hole therein as possible, and then direct against the solder the flame of a blow torch. This old method of making repairs has a number of disadvantages among which is the collection of the solder on the tube, under repair, in bunches or thick lumps or knobs, which hold heat and to an appreciable extent prevent radiation.

Another disadvantage, which has considerable importance, arises from the fact that the use of the blow torch so close to the fins in such a way as to melt the wire solder, sometimes destroys the fins and burns the tubes. This is especially true where one of the inner tubes must be repaired, and it is necessary to direct the flame between some of the outer tubes in order to heat the solder on the tube to be repaired. It is obvious that when the fins of the tubes are destroyed, to that extent proper radiation is prevented.

It is my purpose to provide a method which avoids these disadvantages entirely, and which, when properly practised, leaves the tubes completely repaired of all punctures, and also leaves the fins in proper condition.

The steps of my process are as follows:

I use in connection with my process a frame adapted to support the radiator wall with its front or back up. The frame supports a pot of molten solder. I first use a suitable tool for bringing the separated edges of the tubes snugly together, and then thoroughly clean the exteriors of the tubes by the use of acid solutions poured over them. I then place a wooden bowl or the like below the radiator to catch the drippings, and with a ladle pour very hot molten solder downwardly from a point spaced above, through and around the tubes, with particular care to pour molten metal on the tube to be repaired.

The molten solder spreads rapidly forming a thin film or coating of the solder entirely around the tubes and stopping all holes. This method of repairing the radiator tube not only closes the holes in the wall thereof, but forms a thin coating which serves to strengthen the tube and act as a binder for preventing the subsequent spreading of the seams. Where this method is used, the solder is evenly spread, so that there are no lumps left to interfere with proper and thorough radiation, and the method does not involve the application of an extremely hot flame to either the fins or the tubes, so that neither the fins or tubes are destroyed at any stage in the practice of my process.

I sometimes use heat in the preliminary cleaning of the tubes, but the heat so used is not so great as to injure the tubes, or the fins.

Thus when the radiator has been repaired by my process no injury has been done to the radiator in any way: Its defects have been remedied, and the appearance of the radiator is not injured, as is done where the ordinary process is employed.

Another feature of my process that I consider of importance, arises from the fact that it may be employed for thoroughly repairing tubes that have been treated with various radiator compounds.

It is well known that various anti-leak compounds are used and are poured downwardly through the radiator tubes, and these compounds, which are of cement nature, work outwardly through the crevices or breaks and form a sort of seal. It is very difficult, where the ordinary process of repairing, as hereinbefore described, is used, to repair the breaks in a radiator tube where one of these radiator compounds has been employed, for the reason that it is difficult to remove the particles of the compound.

Where my process is used, by pouring the solder through the radiator several times, all of this compound will be thoroughly removed from the outside of the tubes, on account of the fact that the weight of the solder is such that it takes up the particles of the compound, and carries them away. Thus by pouring the solder through several times, the thickness of the coating is increased, but all vestige of such radiator compound is done away with.

It should be mentioned in this connection that the radiator is so supported at its ends or sides or both, that the molten solder may pass freely through, and without any obstruction at the lower part of the radiator, in its recumbent position which might tend to make the solder collect in lumps at any point.

There may be some changes in the exact steps and operations whereby my process is practised, without departing from the essential purposes and features of my invention, and it is my intention to cover by the claims of the patent to be issued upon my application any such variations in the practice of my process as may be reasonably included within the scope of my claims.

I claim as my invention:

1. The process of repairing a radiator, comprising the supporting of the radiator in recumbent position upon supports arranged adjacent to the edges of the radiator, the bringing together of the separated edges of the radiator tube to be repaired, the thorough cleaning of the exterior of such tube to be repaired, and the pouring of molten solder through the radiator and upon the tube to be repaired for forming a thin film or coating of solder thereon, and the repeating of the last step of such process, namely the pouring of solder through the radiator for removing any anti-leak compounds or the like which may be on the tube, by carrying away such compound with the solder passing through the radiator.

2. The process of repairing liquid-holding radiators for cooling internal combustion engines, comprising first bringing the separated edges of any breaks in the liquid-holding portion of the radiator snugly together, then treating the exterior surfaces of the radiator adjacent to the breaks only so that molten solder will adhere thereto, then placing the radiator on a support with a receptacle below it, and then pouring molten solder onto the radiator in quantities sufficient to cause molten metal to come in contact with all the treated surfaces, to thereby re-tin said surfaces and close the breaks.

Des Moines, Iowa, March 9, 1917.

CLYDE E. SCHULZ.